(12) United States Patent
Guenach et al.

(10) Patent No.: US 7,830,978 B2
(45) Date of Patent: Nov. 9, 2010

(54) DETERMINING CHANNEL MATRICES BY CORRELATED TRANSMISSIONS TO DIFFERENT CHANNELS

(75) Inventors: Mamoun Guenach, Machelen (BE); Gerhard Guenter Theodor Kramer, Chatham, NJ (US); Jerome Louveaux, Louvain-la-Neuve (BE); Jochen Maes, Veerle (BE); Michael Peeters, Ternat (BE); Luc Vandendorpe, Louvain-la-Neuve (BE); Jan Sylvia Verlinden, Deume (BE); Philip Alfred Whiting, New Providence, NJ (US); Geert Bert Ysebaert, Winksele (BE); Miroslav Zivkovic, The Hague (NL)

(73) Assignees: Alcatel Lucent, Paris (FR); Alcatel-Lucent USA Inc., Murray Hill, NJ (US)

( * ) Notice: Subject to any disclaimer, the term of this patent is extended or adjusted under 35 U.S.C. 154(b) by 666 days.

(21) Appl. No.: 11/897,809

(22) Filed: Aug. 31, 2007

(65) Prior Publication Data
US 2009/0060067 A1    Mar. 5, 2009

(51) Int. Cl.
*H04L 25/03* (2006.01)
(52) U.S. Cl. ........................ 375/296; 375/267; 375/299; 455/114.2; 455/115.1; 370/465
(58) Field of Classification Search .................. 375/219, 375/220, 222, 221, 257, 260, 285, 295, 296, 375/299, 267; 455/501, 63.1, 67.11, 67.13, 455/69, 88, 114.2, 114.3, 115.1; 370/204, 370/464, 465
See application file for complete search history.

(56) References Cited

U.S. PATENT DOCUMENTS

| 2003/0016626 | A1 | 1/2003 | Lagerberg et al. ........ 370/230.1 |
| 2004/0264559 | A1 | 12/2004 | Cendrillon et al. .......... 375/219 |
| 2006/0148415 | A1* | 7/2006 | Hamalainen et al. .......... 455/69 |
| 2006/0153178 | A1 | 7/2006 | Cendrillon et al. .......... 370/368 |
| 2008/0247446 | A1* | 10/2008 | Kramer et al. .............. 375/222 |
| 2009/0296848 | A1* | 12/2009 | Tesfai et al. ................. 375/267 |

FOREIGN PATENT DOCUMENTS

WO WO 2008/123977 A1 10/2008

OTHER PUBLICATIONS

U.S. Appl. No. 11/897,877, filed Aug. 31, 2007, Gerhard G. Kramer, et al.
U.S. Appl. No. 11/848,684, filed Aug. 31, 2007, A. De Lind Van Wijngaarden, et al.
U.S. Appl. No. 11/934,347, filed Nov. 2, 2007, Alexei Ashikhmin, et al.

(Continued)

*Primary Examiner*—Dac V Ha
(74) *Attorney, Agent, or Firm*—John F. McCabe

(57) ABSTRACT

A method involves performing a plurality of acts. The acts include transmitting a first signal stream to a first channel of a multi-channel communications medium while transmitting a second signal stream to a different second channel of the medium. The second signal stream is substantially temporally correlated to the first signal stream. The method includes receiving an SINR measured at a receiver configured to receive signals from the first channel. The SINR is measured while the receiver received the first signal stream. The method includes determining a channel matrix element between the first and second channels or a ratio of said channel matrix element to a diagonal element of the channel matrix. The act of determining is based on the received SINR.

17 Claims, 10 Drawing Sheets

OTHER PUBLICATIONS

U.S. Appl. No. 11/796,366, filed Apr. 26, 2002, Gerhard G. Kramer, et al.

Kihong Kim et al, "Interference Mitigation in MIMO Systems by Subset Antenna Transmission", *Wireless Personal Communications*, vol. 40, No. 3, Aug. 9, 2006, pp. 305-315.

R. Cendrillon et al, "Partial crosstalk precompensation in downstream VDSL" Signal Processing, Elsevier Science Publishers B.V., vol. 84, No. 11, Nov. 1, 2004, pp. 2005-2019.

PCT International Search Report dated Apr. 28, 2009 (PCT/US2008/010058) 3 pages.

* cited by examiner

DETERMINING CHANNEL MATRICES BY CORRELATED TRANSMISSIONS TO DIFFERENT CHANNELS

BACKGROUND

1. Field of the Invention

The invention relates to multi-channel communication systems.

2. Discussion of the Related Art

This section introduces aspects that may be helpful to facilitating a better understanding of the inventions. Accordingly, the statements of this section are to be read in this light and are not to be understood as admissions about what is in the prior art or what is not in the prior art.

A variety of communication systems use multiple channels to increase data rates and/or to separate different data streams being communicated. In such systems, the different channels share part of a physical communications medium, which causes inter-channel crosstalk. Such inter-channel crosstalk typically means that the communications transmitted to one channel are, to some extent, received on one or more other channels. The inter-channel crosstalk or interference is typically undesirable.

Many multi-channel communication systems can be described by the linear crosstalk models. The linear crosstalk model defines relations between transmitted and received signals in a single communication time slot as follows:

$$Y = H \cdot X + V \quad (1)$$

In eq. (1), the N-component complex vectors X, Y, and V represent the transmitted signal, the received signal, and the noise signal, respectively. The j-th components $X_j$, $Y_j$, and $V_j$ of these vectors are the values of the transmitted signal, the received signal, and the noise signal on the J-th channel. Herein, the N×N complex matrix, H, will be referred to as the channel matrix. The (j, m)-th component $H_{j,m}$ describes how the physical communication channel produces a signal on the j-th channel in response to a signal being transmitted to the m-th channel. In particular, diagonal elements of the channel matrix, H, describe direct channel couplings, and off-diagonal elements of the channel matrix, H, describe inter-channel crosstalk.

BRIEF SUMMARY

Various embodiments provide methods and apparatus capable of determining off-diagonal elements of the channel matrix of a multi-channel communication system. The embodiments use signal-to-interference-plus-noise ratios (SINRs) that are measured in the presence of temporally correlated data signal streams on different channels in the medium to estimate one or more off-diagonal elements of the channel matrix and/or ratios of such elements.

A first embodiment features a method that includes performing a plurality of steps. The steps include transmitting a first signal stream to a first channel of a multi-channel communications medium while transmitting a second signal stream to a different second channel of the medium. The second signal stream is substantially temporally correlated to the first signal stream. The method includes receiving an SINR measured at a receiver configured to receive signals from the first channel. The SINR was measured while the receiver received the first signal stream. The method includes determining an off-diagonal element of a channel matrix between the first and second channels or a ratio of said off-diagonal element to a diagonal element of the channel matrix. The step of determining is based on the received SINR.

In some embodiments of the method, the step of determining includes estimating a phase and an amplitude of the off-diagonal element of the channel matrix between the first and second channels.

In some embodiments of the method, the steps further include transmitting a third signal stream to the first channel of the medium while transmitting a fourth signal stream to the second channel of the medium, wherein the third and fourth signal streams are substantially temporally uncorrelated. Then, the act of determining is based, in part, on a signal-to-interference-plus-noise ratio measured by the receiver while receiving the third signal stream.

In some embodiments of the method, the first signal stream is produced by precoding a third signal stream and the second signal stream, wherein the third and second signal streams are substantially temporally uncorrelated.

In some embodiments of the method, the steps further include receiving a second signal-to-interference-plus-noise ratio measured at a second receiver, wherein the second receiver is configured to receive signals from the second channel of the medium. The steps also include then, determining a different off-diagonal element of the channel matrix between the first and second channels or a ratio of said different off-diagonal element to a diagonal element of the channel matrix. The step of determining a different off-diagonal element between the first and second channels or a ratio of said different off-diagonal element to a diagonal element of the channel matrix is based on the received second signal-to-interference-plus-noise ratio.

In some embodiments of the method, the step of transmitting a first signal stream includes transmitting the first signal stream from a DSL transmitter to a first local subscriber loop while the second signal stream is transmitted by another DSL transmitter to another local subscriber loop.

In some embodiments of the method, the step of transmitting a first signal stream includes transmitting the first signal stream to a first frequency channel while the second signal stream is transmitted to a different second frequency channel.

Other embodiments feature apparatus that includes a transmitter. The transmitter is configured to transmit a first signal stream to a first channel of a multi-channel communications medium and to transmit a second signal stream to a second channel of the multi-channel communications medium. The transmitter is configured to cause the first signal stream to be temporally correlated to the second signal stream while a signal-to-noise ratio is measured at a receiver connected to receive the first signal stream from the first channel. The transmitter is configured to determine an off-diagonal element of a channel matrix between the first and second channels or a ratio of said element to a diagonal element of the channel matrix. The transmitter is configured to determine the element or ratio based on a received value of the measured signal-to-interference-plus-noise ratio.

In some embodiments of the apparatus, the first transmitter includes a second transmitter configured to transmit the first signal stream to a first frequency channel of the medium and also includes a third transmitter configured to transmit the second signal stream to a different second frequency channel of the medium.

In some embodiments of the apparatus, the first transmitter includes a second transmitter configured to transmit the first signal stream to a first local subscriber loop as DSL tones and also includes a third transmitter configured to transmit the second signal stream to another local subscriber loop stream as DSL tones to another local subscriber loop. The first transmitter may be configured to estimate a phase and an amplitude of the ratio of the off-diagonal element of the channel matrix between the first and second channels to the diagonal element of the channel matrix. The first transmitter may be configured to estimate a phase and an amplitude of the off-diagonal element of the channel matrix between the first and second channels. The first transmitter may be configured to produce the first signal stream by precoding a third signal stream and the second signal stream together, wherein the third and second signal streams are substantially temporally uncorrelated.

BRIEF DESCRIPTION OF THE DRAWINGS

In the Figures and text, like reference numerals indicate elements with similar functions.

Herein, various embodiments are described more fully by the Figures and the Detailed Description of Illustrative Embodiments. Nevertheless, the inventions may be embodied in various forms and are not limited to specific embodiments described in the Figures and the Detailed Description of Illustrative Embodiments.

DETAILED DESCRIPTION OF ILLUSTRATIVE EMBODIMENTS

U.S. patent application Ser. No. 11/897,877 entitled "DETERMINING A CHANNEL MATRIX BY MEASURING INTERFERENCE", by Gerhard G. Kramer, Philip A. Whiting, and Miroslav Zivkovic and U.S. patent application Ser. No. 11/848,684 entitled "METHOD AND APPARATUS FOR SELF-TUNING PRECODER", by Adriaan de Lind van Wijngaarden, Gerhard G. Kramer, Philip A. Whiting, and Miroslav Zivkovic were filed on the same date as the present patent application and are incorporated herein by reference in their entirety.

Herein, phase may refer to either a phase angle or a phase factor. Also, herein, an estimate of a phase itself and an estimate of a trigonometric function of the phase angle are both estimates of the phase angle. For example, evaluating the real and imaginary parts of a complex number provides an estimate of a phase of the complex number. Also, herein, a phase may refer to a relative phase or an absolute phase.

Figure 1:
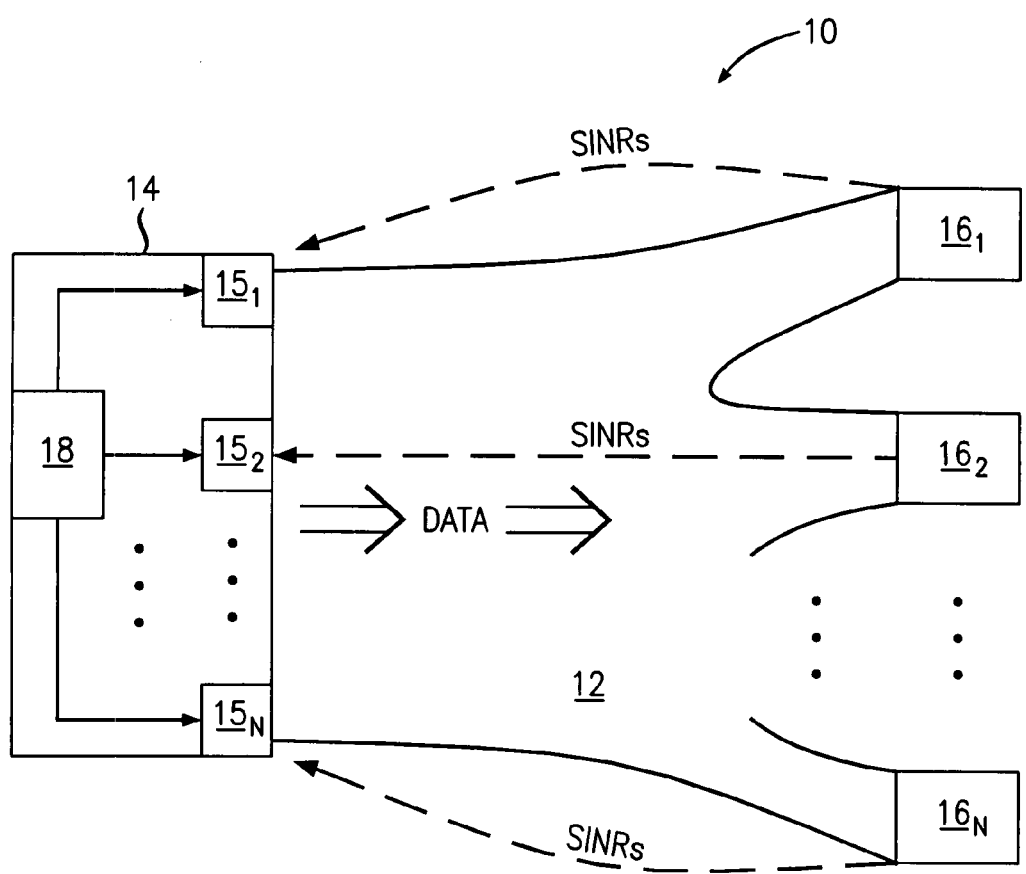
FIG. 1 is a block diagram illustrating a multi-channel communication system that uses measurements of signal-to-interference-plus noise ratios to estimate off-diagonal element(s) of the channel matrix therein.

FIG. 1 shows a multi-channel communication system 10 that includes a physical communications medium 12, a multi-channel transmitter 14, and N single-channel receivers $16_1$, $16_2$, ..., $16_N$. The physical communications medium 12 supports direct point-to-point communications channels between the transmitter 14 and the N receivers $16_1$, ..., $16_N$. Each communications channel supports the forward transport of signal streams from a corresponding transmitting device $15_1, 15_2, ..., 15_N$ of the transmitter 14 to a corresponding one of the receivers $16_1, 16_2, ..., 16_N$. For that reason, the transmitter 14 can send independent signal streams to each of the receivers $16_1, ..., 16_N$ via the N point-to-point channels of the physical communications medium 12. In some embodiments, the point-to-point channels also support communications in the reverse direction from the receivers $16_1, ..., 16_N$ to the corresponding transmitting devices $15_1, ..., 15_N$, e.g., at the same or different data rates than those for forward communications.

The transmission properties of the multi-channel communication system 10 are, at least, approximately described by the linear crosstalk model of eq. (1). Though diagonal elements of the channel matrix, H, are often much larger than off-diagonal elements, there are reasons that estimates for off-diagonal element(s) of the channel matrix, H, may be desired. For example, inter-channel crosstalk at the receivers $16_1, ..., 16_N$ can reduce achievable data rates, and a knowledge of the channel matrix, H, can be used to reduce such undesired crosstalk via precompensation in a precoder 18.

The precoder 18 precodes downstream data transmissions to two or more of the N channels, in parallel. Herein, precoding refers to performing of a linear transformation on an array of simultaneous output signals prior to transmitting said signals, in parallel, to a physical communications medium, e.g., the medium 10. Herein, the precoding may be performed for two different reasons. First, such precoding may be performed to substantially remove crosstalk at a set of downstream receivers, e.g., a subset of the receivers $16_1$-$16_N$ in FIG. 1. This type of precoding typically requires a knowledge of estimates of off-diagonal elements of the channel matrix, H, and is also know as precompensation. Second, precoding may be performed between signals to be transmitted to a small set of the channels in order to introduce temporal correlations between signal streams transmitted to said different channels during measurements of properties of said channels. Indeed, such temporal correlations are used in below-described method 30 during the measurement of signal-to-noise-plus-interference-ratios (SINRs) for said channels, wherein the SINRs are subsequently used to determine off-diagonal elements of the channel matrix, H.

The communication system 10 is configured to determine one or more off-diagonal elements of the channel matrix, H, or one or more ratios of such off-diagonal to diagonal elements of the channel matrix. These one or more determinations do not rely on a communication protocol that supports direct measurements of the off-diagonal elements of the channel matrix, H. Instead, the receivers $16_1, \ldots, 16_N$ measure their channel SINRs, and the transmitter 14 uses these measured channel SINRs to estimate one or more of the off-diagonal element(s) of the channel matrix, H. The receivers $16_1, \ldots, 16_N$ may perform such channel SINR measurements during session initialization periods and/or during data transmission sessions, e.g., to track the evolution of the channel matrix, H. The receivers $16_1, \ldots, 16_N$ may transmit therein measurements of the channel SINR(s) back to the transmitter 14, e.g., via the same physical communications medium 12.

Herein, a channel SINR is a property of a single channel or of a closely related small group of such single channels so the value of the SINR is indicative of the SINR in the individual channels of the related group.

The multi-channel communication system 10 of FIG. 1 may have a large variety of specific implementations as illustrated, e.g., by systems 10A, 10b, 10C, 10D in FIGS. 2-6.

Figure 2:
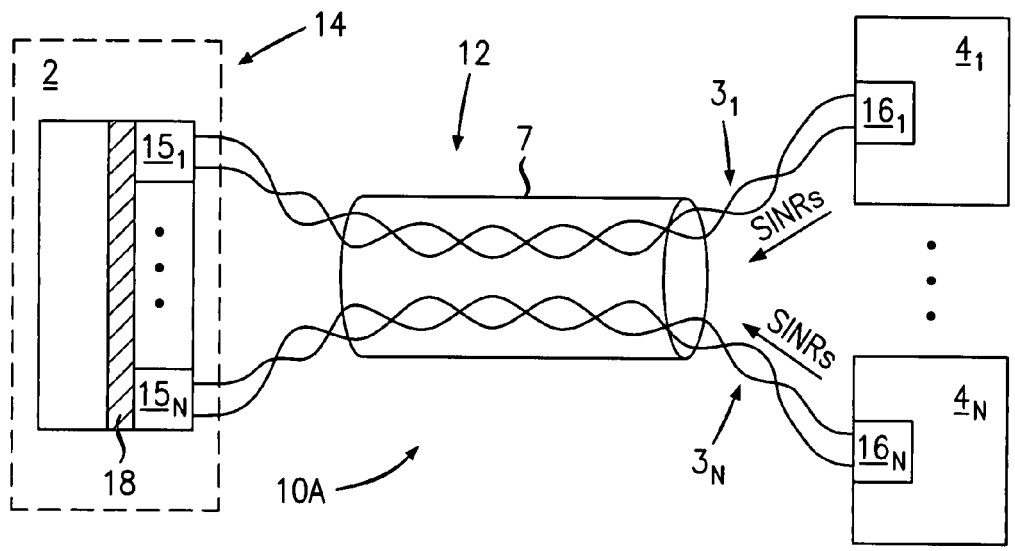
FIG. 2 is a block diagram illustrating a digital subscriber line (DSL) communication system that is a specific embodiment of the system of FIG. 1.

FIG. 2 shows part of a digital subscriber line (DSL) communication system 10A that includes an access multiplexer 2, local subscriber communication loops $3_1, \ldots, 3_N$, and DSL subscriber premises equipment $4_1, \ldots, 4_N$. The access multiplexer 2 and its set of DSL modems $15_1, \ldots, 15_N$ function of the transmitter 14 of FIG. 1. The collection of local subscriber communication loops $3_1, \ldots, 3_N$ functions as the multi-channel communications medium 12 of FIG. 1. The DSL subscriber premises equipment $4_1, \ldots, 4_N$ and corresponding DSL modems $16_1, \ldots, 16_N$ function as the receivers $16_1, \ldots, 16_N$ of FIG. 1. Each local subscriber communication loop $3_1, \ldots, 3_N$ forms a direct channel between a corresponding one of the DSL modems $15_1, \ldots, 15_N$ of the access multiplexer 2 and a corresponding one of the DSL modems $16_1, \ldots, 16_N$ of the DSL subscriber premises equipment $4_1, \ldots, 4_N$.

In FIG. 2, some of the local communication loops $3_1, \ldots, 3_N$ may have crosstalk there between, e.g., because their twisted copper wire pairs share one or more common binders or cables 7. In the one or more binders or cables 7, the physical nearness of the twisted copper wire pairs of different ones of the local communication loops $3_1, \ldots, 3_N$ can cause crosstalk and thus, produce non-zero off-diagonal elements in the channel matrix, H.

In FIG. 2, the DSL modems $16_1, \ldots, 16_N$ of the DSL subscriber premises equipment $4_1, \ldots, 4_N$ are configured to measure signal-to-interference-plus-noise ratios (SINRs) of single DSL tones or to measure averages of SINRs over a small number of nearby DSL tones, e.g., averages 4-8 DSL tones. The DSL modems $16_1, \ldots, 16_N$ measure said SINRs at initialization of DSL sessions and/or during the DSL communications themselves, e.g., to track the evolution of the channel matrix, H. The DSL modems $16_1, \ldots, 16_N$ of the DSL subscriber premises equipment $4_1, \ldots, 4_N$ transmit measured values of the SINRs back to the DSL modems $15_1, \ldots, 15_N$ of the access multiplexer 2, e.g., via the local communication loops $3_1, \ldots, 3_N$.

Figure 3:
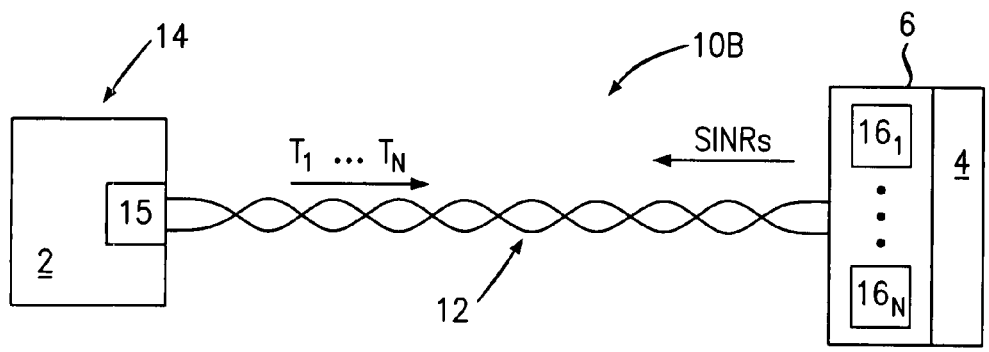
FIG. 3 is a block diagram illustrating a part of a DSL communication system that supports DSL communications to a single DSL subscriber in a specific embodiment of the system of FIG. 1.

FIG. 3 illustrates a part of a DSL communication system 10B that supports data communications between an access multiplexer 2 and a single DSL subscriber 4 over N separate DSL tones $T_1, \ldots, T_N$. The DSL communication system 10B includes a DSL modem 15 in the access multiplexer 2, a local subscriber communications loop 3, and a DSL modem 6 in the DSL subscriber premises equipment 4. The DSL modem 6 includes a demodulator circuit $16_1, \ldots, 16_N$ for each of the DSL tones $T_1, \ldots, T_N$. The access multiplexer 2 and its DSL modem 15 function as the transmitter 14 of FIG. 1. The local loop 3, e.g., a twisted pair of copper wires, functions as the physical communications medium 12 of FIG. 1. Each frequency band of one of the DSL tones $T_1, \ldots, T_N$ functions as one of the channels of FIG. 1. Each demodulator circuit $16_1, \ldots, 16_N$ of the DSL subscriber premises equipment 4 functions as one of the receivers $16_1, \ldots, 16_N$ of FIG. 1.'

In the DSL communication system 10B, the DSL tones $T_1, \ldots, T_N$ are closely spaced in frequency. For that reason, crosstalk occurs between the frequency bands of different ones of the DSL tones $T_1, \ldots, T_N$. The modem 6 of the DSL subscriber 4 measures SINRs on the frequency bands of the individual DSL tones $T_1, \ldots, T_N$ or averages of SINRs over small groups of neighboring ones of the DSL tones $T_1, \ldots, T_N$. The modem 6 may perform these SINR measurements at initialization of a DSL session and/or during DSL data communications, e.g., to track changes to the channel matrix, H. The DSL modem 6 of the DSL subscriber 4 transmits the values obtained by such SINR measurements to the DSL modem 5 of the access multiplexer 2, e.g., via the same local subscriber communication loop 3.

Referring again to FIG. 2, some embodiments of the communication system 10A use multiple DSL tones $T_1, \ldots, T_M$ to transmit data between corresponding pairs of DSL modems $15_1, \ldots, 15_N$ and DSL modems $16_1, \ldots, 16_N$. In such embodiments, each frequency range of one DSL tone $T_1, \ldots, T_M$ of one local communication loop $3_1, \ldots, 3_N$ may define a single channel of the physical communication medium 10 in FIG. 1. In such embodiments, inter-channel crosstalk can differently affect the various DSL tones of the different local communication loops $3_1, \ldots, 3_N$. Thus, in such embodiments, the columns and rows of the channel matrix, H, may be indexed by both the identities of DSL tones $T_1, \ldots, T_M$ (or small disjoint groups thereof) and the identities of the local communication loops $3_1, \ldots, 3_N$. In such embodiments, each DSL modem $16_1, \ldots, 16_N$ may measure a separate SINR for the frequency band of one DSL tone $T_1, \ldots, T_M$ or may measure an SINR averaged over a small number of close frequency bands of such DSL tones $T_1, \ldots, T_M$.

Figure 4:
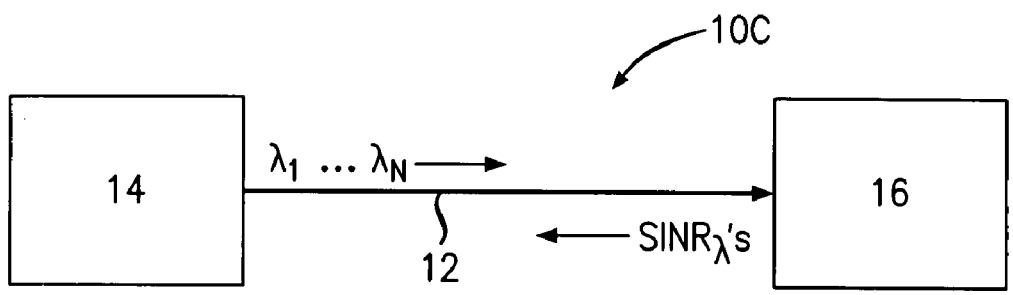
FIG. 4 illustrates a wavelength-division-multiplexed (WDM) optical communication system that is a specific embodiment of the system of FIG. 1.

FIG. 4 illustrates a wavelength-division-multiplexed (WDM) optical fiber communication system 10C that includes a fiber optical transmission line 12, a multi-wavelength optical transmitter 14, and a multi-wavelength optical receiver 16. The fiber optical transmission line 12 functions as the physical communication medium 12 of FIG. 1 by supporting transmissions of optical data signals on a set of wavelength channels $\lambda_1, \ldots, \lambda_N$. The wavelength channels $\lambda_1, \ldots, \lambda_N$ are closely spaced thereby causing optical crosstalk there between. The optical receiver 16 measures SINRs for each wavelength channel $\lambda_1, \ldots, \lambda_N$, i.e., $SINR_\lambda$'s, at session initializations and/or during the transmission of optical communications, i.e., to track changes to the channel matrix, H. The optical receiver 16 transmits the measured $SINR_\lambda$'s to the optical transmitter 14, e.g., via the fiber optical transmission line 12 itself.

Figure 5:
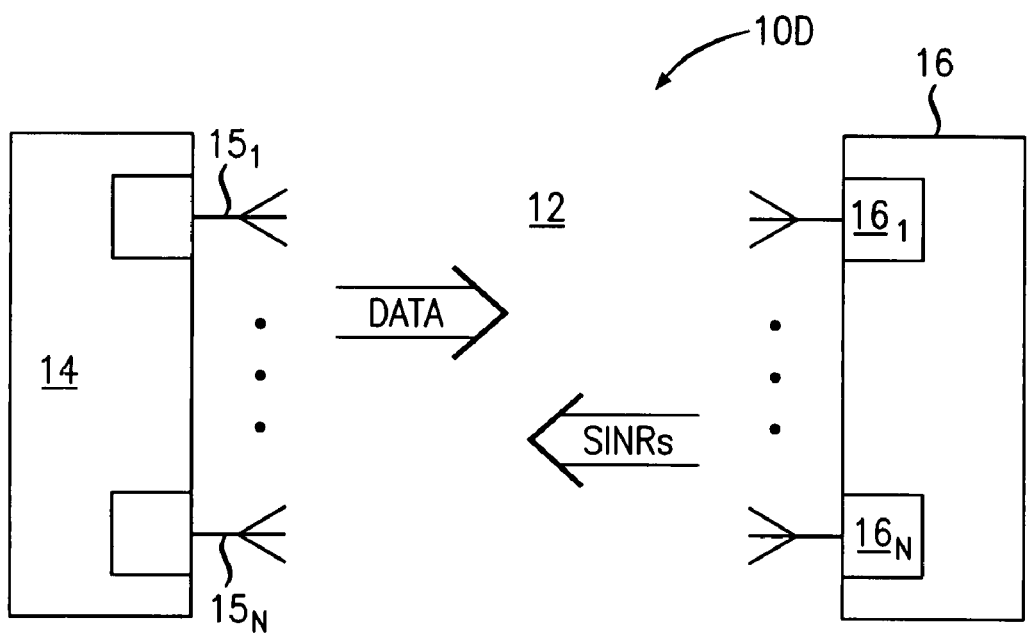
FIG. 5 is a block diagram illustrating a wireless communication system with a multiple-antenna transmitter that is a specific embodiment of the system of FIG. 1.

FIG. 5 illustrates a portion of a multiple-antennae wireless communication system 10D that includes a wireless transmitter 14 with a plurality of separate wireless transmission devices $15_1, \ldots, 15_N$, a wireless receiver 16 with a plurality of separate wireless receiving devices $16_1, \ldots, 16_N$, and a free space region 12. The free space region 12 couples the wireless transmission devises $15_1, \ldots, 15_N$ of the transmitter 14 to the wireless receiving devices $16_1, \ldots, 16_N$ of the receiver 16.

Thus, the free space region 12 functions as the physical communication medium 10 of FIG. 1. Each wireless receiving device $16_1, \ldots, 16_N$ is configured to measure its own SINR at initialization of a data communication session and/or while carrying out such data communications. The wireless receiver 16 is configured to transmit the measured values of the SINRs back to the wireless transmitter 14, e.g., via the free space communications medium 12.

Figure 6:
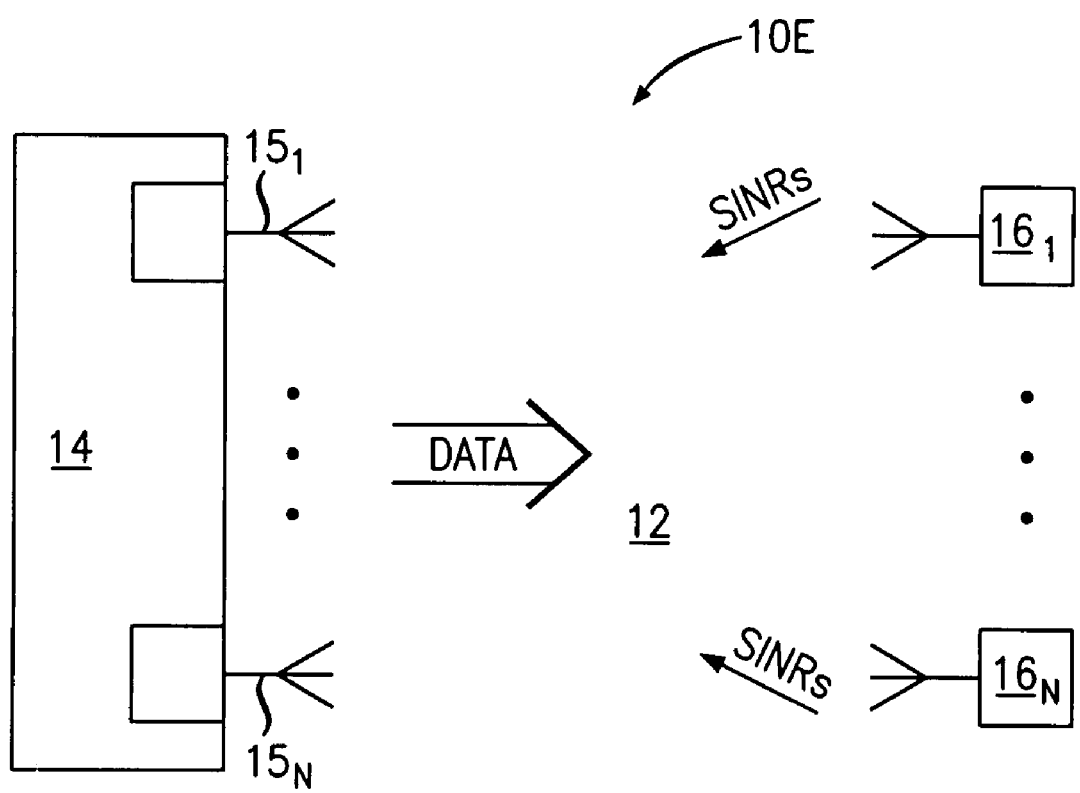
FIG. 6 is a block diagram illustrating a wireless communication system with a multiple-antenna transmitter that is another specific embodiment of the system of FIG. 1.

FIG. 6 illustrates another embodiment of a multiple-antennae wireless communication system 10E. The system 10E includes a wireless transmitter 14 with wireless transmission devices $15_1, \ldots, 15_N$, a plurality of independent wireless receiving devices $16_1, \ldots, 16_N$, and a free space region 12. The free space region 12 couples the wireless transmission devises $15_1, \ldots, 15_N$ of the transmitter 14 to the wireless receiving devices $16_1, \ldots, 16_N$ of the receiver 16. Thus, the free space region 12 functions as the physical communication medium 10 of FIG. 1. Each wireless receiving device $16_1, \ldots, 16_N$ is configured to measure its SINR regularly and to send each measured value of its SINR back to the wireless transmitter 14 without substantial delay.

Each multi-channel communication systems 10-10E of FIGS. 1-6 is configured to estimate one or more off-diagonal element(s) of its channel matrix, H, according to a method 30. In the method 30, correlated signal transmissions over different channels are used to probe a system while measuring properties for use in determining off-diagonal element(s) of the system's channel matrix, H. By sweeping the various pairs of channels, some embodiments of multi-channel communication systems use the method 30 to estimate each off-diagonal element of the channel crossing matrix, H. In particular, such multi-channel communication systems may use the method 30 to initialize and/or update a precoder that provides for ideal precompensation. Herein, ideal precompensation refers to precoding that is configured to substantially remove crosstalk at downstream receivers of a multi-channel communication system.

Figure 7:
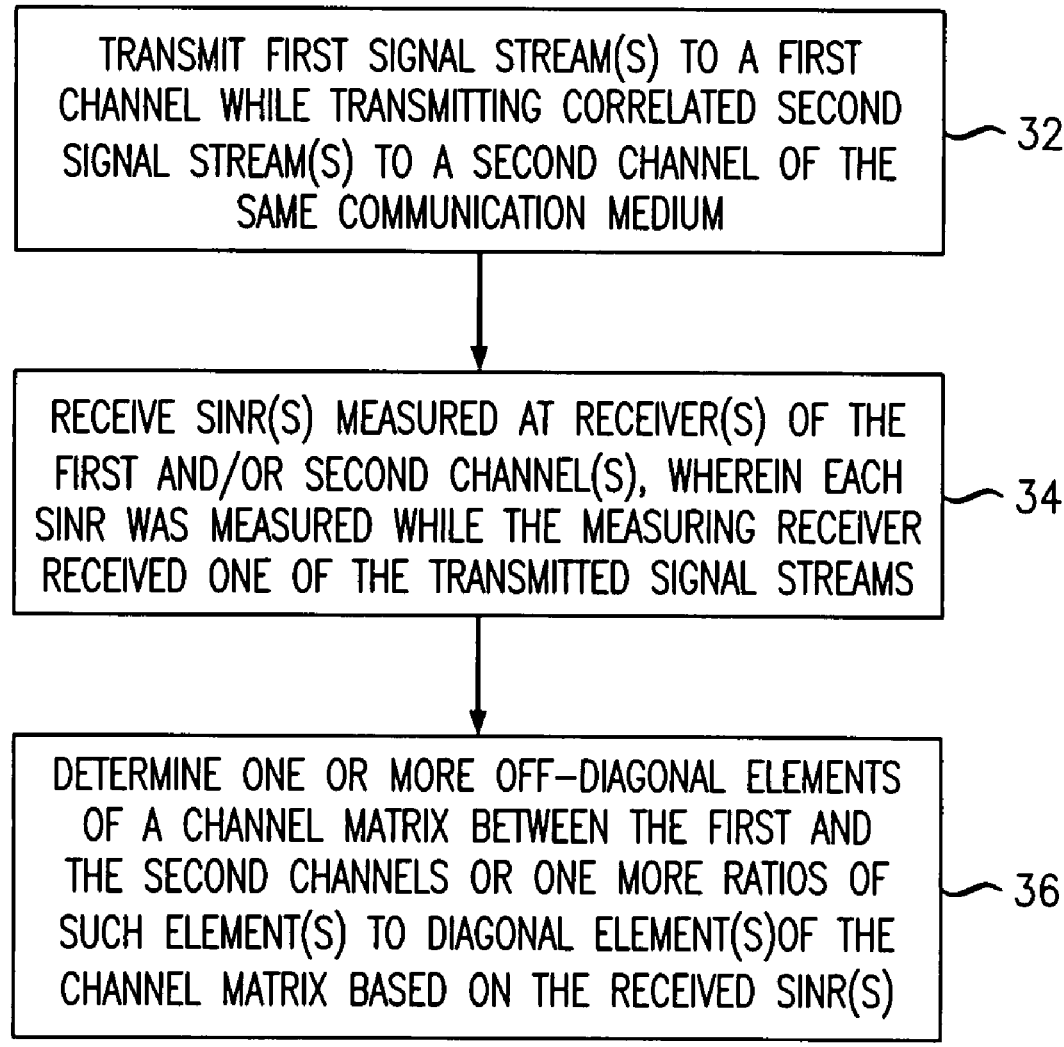
FIG. 7 is a flow chart illustrating a method for estimating one or more off-diagonal elements of a channel matrix in a multi-channel communication system, e.g., the systems of FIGS. 1-6.
Figure 8:
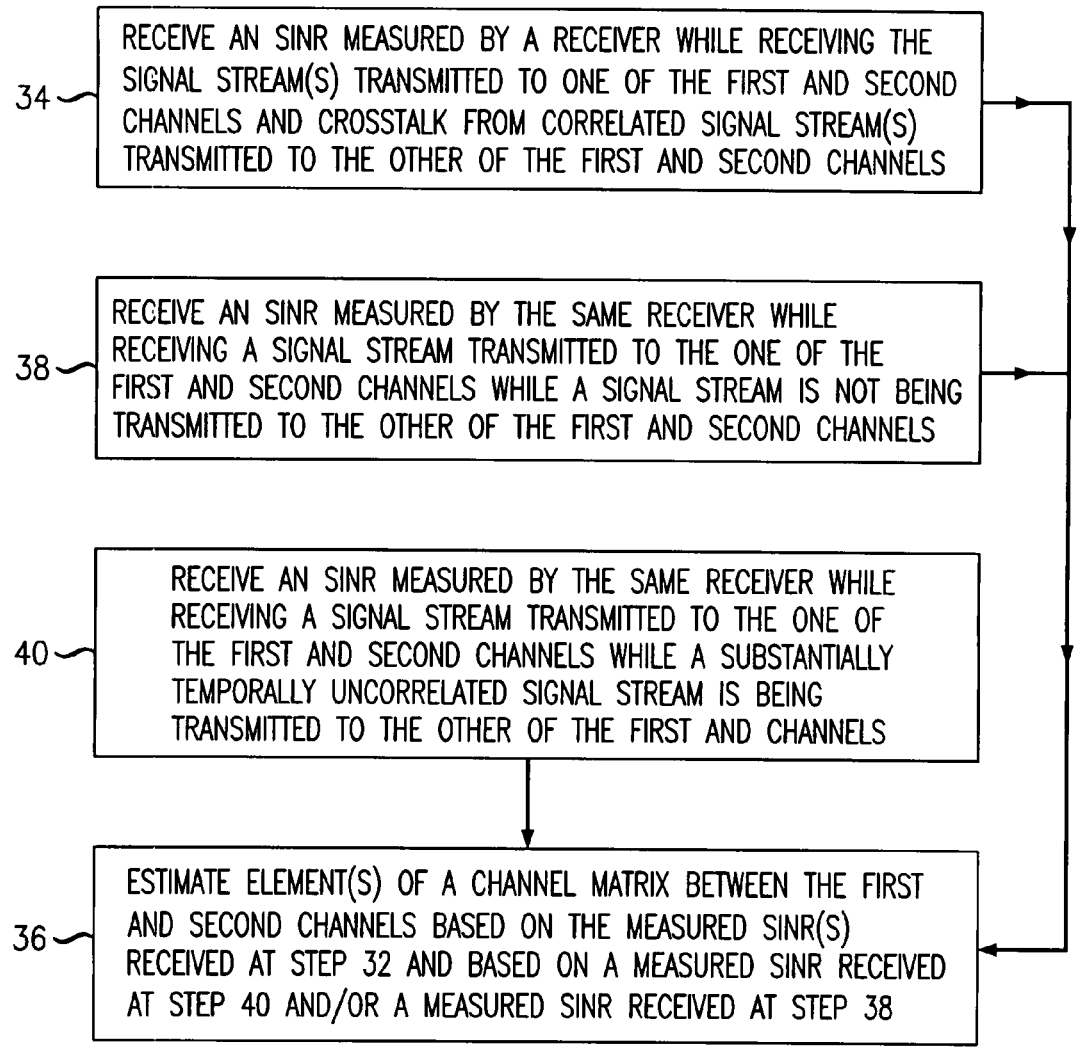
FIG. 8 is a flow chart illustrating various specific embodiments of the method of FIG. 7.

FIGS. 7-8 illustrates how the method 30 determines either an off-diagonal element of the channel matrix, H, or a ratio of such an off-diagonal element to a diagonal element of the same channel matrix, H.

The method 30 includes transmitting one or more first signal streams from a transmitter, e.g., the transmitter 14 of FIG. 1, to a first channel, S, of a physical communications medium, e.g., the medium 12 of FIG. 1 (step 32). The step 32 of transmitting one or more first signal streams is performed in parallel with transmitting one or more temporally correlated second signal streams from the same transmitter to a different second channel, K, of the same physical communications medium.

At the step 32, the performance of the parallel transmission to the first and second channels may include precoding a third signal stream and the second signal stream to produce the first signal stream. Here, the third and second signal streams may be temporally uncorrelated. Such precoding can cause the temporal correlation between the first and second signal streams at the step 32. In particular, such precoding will cause the first and second streams to be temporally correlated in a lock-step manner, i.e., correlated in a signal-interval-by-signal interval manner.

At the step 32, the physical communications medium supports crosstalk between the first channel, S, and the second channel, K.

At the step 32, one or multiple pairs of temporally correlated first and second signal streams may be transmitted. In embodiments where multiple pairs of such correlated streams are transmitted, the different pairs will typically have different correlations there between as illustrated below.

The method 30 includes receiving one or more SINRs at the transmitter, wherein each such SINR is measured by a receiver for the first channel, S, or by a receiver for the second channel, K (step 34). Herein a "receiver for a channel" refers to a receiver configured and connected to receive a signal stream from the channel. The receiver may be, e.g., one of the receivers $16_1, \ldots, 16_N$ of FIG. 1.

At the step 34, each such SINR is measured while the measuring receiver receives one of the first or second signal streams transmitted in the step 32. In embodiments where multiple pairs of correlated signal streams are transmitted at the step 32, said receiver measures a separate SINR while receiving one signal stream of each such pair. In addition, the measurement of each SINR for the step 34 is performed subject to crosstalk from the stream of the same pair that the measuring receiver is not configured or connected to receive.

Herein, the value of each SINR of the step 34 will be referred to as a $SINR_{CXT}$ where the subscript CXT means correlated crosstalk. This notation is used, because each such SINR is measured in the presence of correlated crosstalk from one of the signal streams transmitted at the step 32. Preferably, the measurement of each such $SINR_{CXT}$ includes temporal averaging so that signal streams transmitted to other channels do not contribute correlated contributions to the measured SINR.

The method 30 includes determining an off-diagonal element of the channel matrix, H, between the first channel, S, and the second channel, K, or determining a ratio of such an off-diagonal element to a diagonal element of the same channel matrix, H (step 36). Here, the determination is based, at least in part, on the one or more measured SINR(s), which were received by the transmitter at the step 34. In some embodiments, the transmitter 14 of FIG. 1 performs the determination of the matrix element or ratio thereof at the step 36.

In some specific embodiments, the method 30 also includes performing one or more of steps 38 and 40 as illustrated in FIG. 8.

Referring to FIG. 8, the method 30 may include receiving, at the transmitter, another SINR measured by the same receiver as in the step 34 (step 38). The receiver measures this other SINR during a period in which one of the first and second signal streams S and K is not transmitted. That is, this other measured SINR is measured while no signal stream is transmitted to the channel of the pair that could other wise produce crosstalk at the receiver measuring the SINR. Herein, an SINR measured at the step 38 will be referred to as an $SINR_{NXT}$ where the subscript NXT means no crosstalk. This notation is used, because this SINR is measured in the absence of crosstalk from the one of the first and second channels from which the receiver is not configured to receive data streams. Preferably, the measurement of $SINR_{NXT}$ includes the averaging of measurements to average out correlations with any remaining active channels of the communication system.

In specific embodiments of the method 30 where the step 38 is performed, the determining of an off-diagonal element of the channel matrix, H, or of a ratio of an off-diagonal element to a diagonal element of the channel matrix at the step 36 will also be based, in part, on the $SINR_{NXT}$ received by the transmitter at the step 38.

Referring to FIG. 8, the method 30 may include receiving, at the same transmitter, yet another SINR measured by the same receiver that measured the SINR received at the step 34 (step 40). The receiver measures this yet other SINR while substantially temporally uncorrelated signal stream(s) are transmitted, in parallel, to the first and second channels. Herein, the SINR measured at step 40 will be referred to as an $SINR_{UXT}$ where the subscript UXT means uncorrelated crosstalk, because this SINR is measured in the presence of temporally uncorrelated crosstalk from the other of the first and second channels of the step 32, i.e., from the channel for which the receiver does not function as a receiver. Preferably, the measurement of $SINR_{UXT}$ includes temporally averaging that substantially averages out correlations from crosstalk at the receiver due to any remaining active channels.

In specific embodiments of the method 30 where the step 40 is performed, the determination of an off-diagonal element of the channel matrix, H, or of a ratio of such an off-diagonal element to a diagonal element of the same channel matrix, H, at the step 36 will also be based, in part, on the $SINR_{UXT}$ received by the transmitter at the step 40.

In some embodiments, the multi-channel communication system 10 of FIG. 1 is configured so the receivers for both the first and the second channels transmit measured SINRs to the receiver at the step 34. Then, the performance of the step 36 may include determining both off-diagonal elements of the channel matrix, H, between the first and second channels or may include determine ratios of both such off-diagonal elements to diagonal elements of the channel matrix, H. Such determinations will be based in part on the measurements of the two SINRs that are received at the step 34.

Example 1

Finding the Channel Matrix in the Absence of Precompensation

Figure 9:
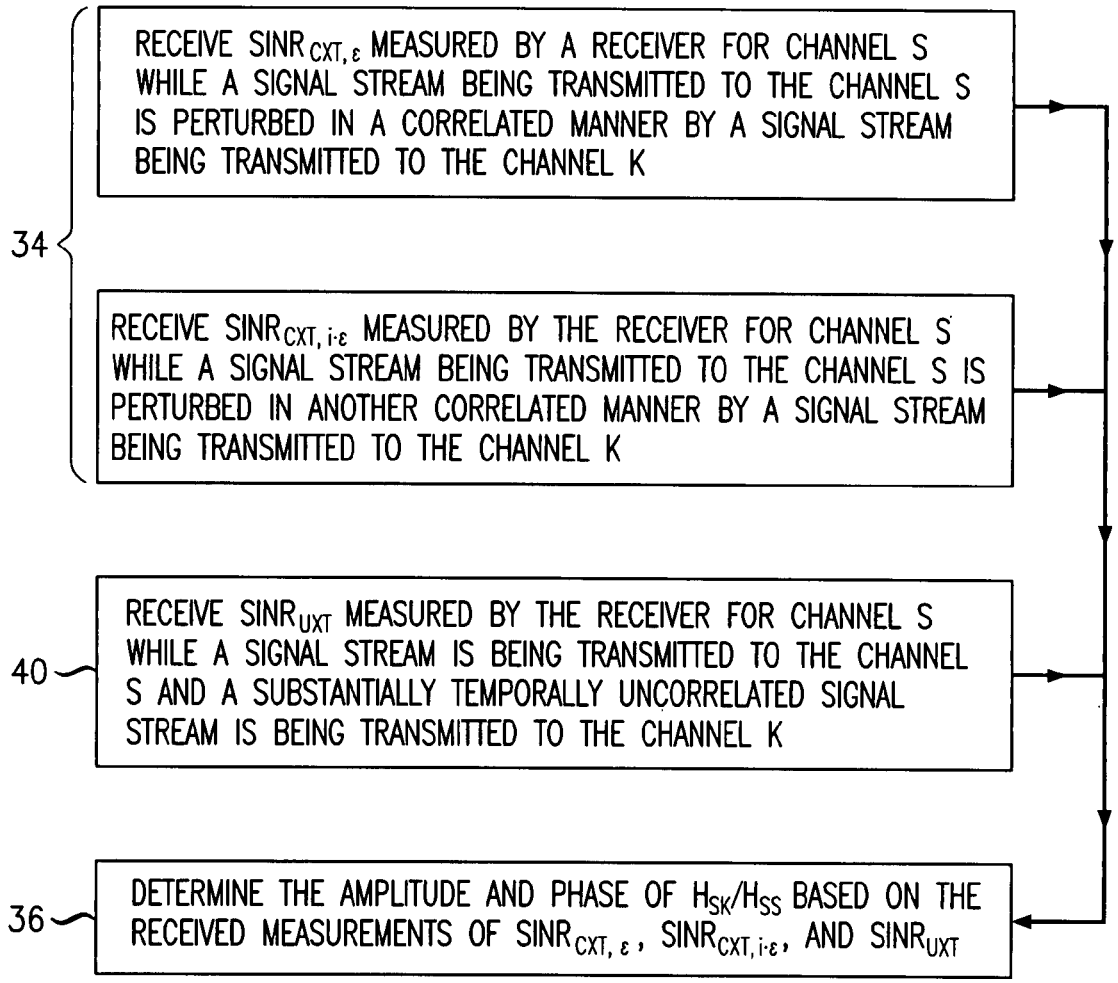
FIG. 9 is a flow chart illustrating first and third exemplary embodiments of the methods of FIGS. 7 and 8 in which an off-diagonal element of the channel matrix is determined in the absence of precompensation and in the presence of precompensation in a subgroup of channels, respectively.

FIG. 9 illustrates a first exemplary embodiment of the method 30 in which the steps 34, 36, and 40 of FIG. 8 are performed. This exemplary embodiment is performed when the multi-channel communication system does not have precompensation. For example, this exemplary embodiment may be used to obtain an initial form of a precompensation matrix.

This exemplary embodiment is applied to a multi-channel communication system in which the channels 0, ..., K are active during the measurements of SINR(s) during the step 32. In this embodiment, the amplitude and phase of a ratio of a channel matrix element between the channels S and K over a diagonal element of said matrix is determined at the step 36. The determined ratio is $H_{SK}/H_{SS}$ where the first channel of the step 32 is the channel S and the second channel of the step 32 is the channel K.

In this exemplary embodiment, the step 32 involves transmitting the first signal stream $X_S(1), \ldots, X_S(P)$ to the first channel, S, while transmitting, in parallel, the second signal stream $X_K(1), \ldots, X_K(P)$ to the second channel K. During the transmission, each signal $X_S(j)$ of the first signal stream satisfies $X_S(j)=D_S(j)+z \cdot X_K(j)$ for $j=1, \ldots, P$. Here, "z" is a real or complex scale factor that is constant for each such first signal stream, but may differ in different first signal streams. From this form, one sees that constant precodings of the second signal stream $X_K(1), \ldots, X_K(P)$ with the signal stream $D_S(1), \ldots, D_S(P)$ can produce the first signal stream(s) transmitted at the step 32. During the step 32, each signal stream $D_S(1), \ldots, D_S(P)$ is substantially temporally uncorrelated to the corresponding signal stream $X_K(1), \ldots, X_K(P)$. For example, each signal stream of $D_S(j)$'s may carry a data sequence that is independent of the data sequence carried by the corresponding signal stream of $X_K(j)$'s. Alternatively, the signal stream of $D_S(j)$'s may be a stream of null signals. During the lock-step transmissions of each pair of corresponding $X_S(1), \ldots, X_S(P)$ and $X_K(1), \ldots, X_K(P)$ signal streams at the step 32, the additive term $z \cdot X_K(j)$ in the $X_S(j)$'s causes the first signal stream to be temporally correlated to the second signal stream.

Herein, an SINR measured at a receiver of the first channel, S, while transmitting a temporally correlated pair of signal streams $X_S(1), \ldots, X_S(P)$ and $X_K(1), \ldots, X_K(P)$ to the first channel, S, and the second channel, K, is referred to as an $SINR_{CXT,z}$.

This first exemplary embodiment applies several conditions to simplify the interpretation of the SINRs measured by the receiver for the first channel, S. First, during the measuring period of each $SINR_{CXT,z}$, temporal correlations between the set comprising the signal stream $D_S(1), \ldots, D_S(P)$ and the signal streams transmitted to the channels other than the first channel, S, are small compared to transmitted per-channel powers. These correlations may be small provided that each of these signal streams carries an independent data stream and the period for averaging each measurement of an $SINR_{CXT,z}$ is long enough. Second, during the measuring period of each $SINR_{CXT,z}$, temporal correlations between the signal stream transmitted to the second channel, K, and the signal streams transmitted to the other channels, i.e., except the first and second channels S and K, are small compared to transmitted per-channel powers. For convenience, in this embodiment, conditions are also imposed on transmitted powers, but a person of skill in the art would be able to modify the exemplary embodiment to account for different power conditions. The first power condition is that the average power transmitted to each channel, $0, \ldots, K$, except the first channel, S, is $P_W$, i.e., when averaged over a time period used to measure an $SINR_{CXT,z}$. The second power condition is that the average power of the signal stream $D_S(1), \ldots, D_S(P)$ is also $P_W$, when averaged over a time period used to measure an $SINR_{CXT,z}$. For the above-described conditions, each measured value of an $SINR_{CXT,z}$ is approximately given by:

$$SINR_{CXT,z} = \left[ P_W |H_{SS}|^2 \Big/ \left( P_W \sum_{J \neq S,K} |H_{SI}|^2 + P_W |H_{SK} + z \cdot H_{SS}|^2 + P_N \right) \right] \quad (2)$$

In eq. (2), $P_N$ is the average noise power at the receiver for the channel, S, over the time period during which the receiver measures the value of $SINR_{CXT,z}$.

As shown in FIG. 9, two such correlated pairs of signal streams are transmitted to the first and second channels at the step 32. For one such pair of signal streams, $z=\epsilon$ where $\epsilon$ is real in this example. For the other such pair of signal streams, $z=i \cdot \epsilon$ where "i" is the square root of $-1$. In some such exemplary embodiments, $\epsilon$ is fixed to be much smaller that "one" so that the temporally correlated portion of each first signal stream is very small compared to the $D_S(P), \ldots, D_S(P)$ signal streams. The use of such a small perturbation can help to enable the first signal stream to carry data while the values of $SINR_{CXT,z}$ are being measured to estimate off-diagonal element(s) of the channel matrix. The use of such a small perturbation to the $D_S(P), \ldots, D_S(P)$ signal streams can also help to ensure that the temporally correlated perturbations do not cause violations of external constraints on the power transmitted to the first channel, S.

In the first exemplary embodiment, the method 30 may optionally include performing the step 38 of FIG. 8. During such a performance of the step 38, conditions are also maintained to simplify the interpretation of the measured value of $SINR_{NXT}$. In particular, the conditions are that temporal correlations between the signal stream transmitted to the first channel, S, and the signal streams transmitted to the others of channels 0, ..., (K−1) are small compared to transmitted per-channel powers therein. For simplicity, conditions are also imposed on transmitted powers, but a person of skill in the art would be able to appropriately modify this described embodiment to account for other power conditions were imposed. The imposed power conditions are that an average power $P_W$ is transmitted to each active channel 0, ..., (K−1) when averaged over the time period used to measure the value of $SINR_{NXT}$. For these conditions, at the step 38, the measured value of $SINR_{NXT}$ will be approximately given by:

$$SINR_{NXT} = \left[P_W|H_{SS}|^2\right] / \left[P_W \sum_{J \ne S,K} |H_{SJ}|^2 + P_N\right]. \quad (3)$$

In eq. (3), $P_N$ is the average of the noise power at the receiver, S, over the time period during which the receiver for the first channel, S, measures the value of $SINR_{NXT}$.

In this exemplary embodiment, the method 30 includes performing the step 40 as illustrated in FIG. 9. During the performance of the step 40, several conditions are maintained to simplify the interpretation of the measured value of $SINR_{UXT}$. First, temporal correlations between the signal stream transmitted to the first channel, S, and the signal streams transmitted to others of the channels 0, ..., K are kept small compared to transmitted per-channel powers. Second, during the measuring period for $SINR_{UXT}$, temporal correlations between the signal stream transmitted to the second channel, K, and the signal streams transmitted to the other channels are kept small compared to the transmitted per-channel powers. For simplicity, a condition is also imposed on transmitted powers, but a person of skill in the art would be able to appropriately modify the described embodiment if other conditions were imposed on the transmitted powers. The imposed power condition is that the power transmitted to each active channel 0, ..., K is $P_W$ when averaged over the time period used to measure the value of $SINR_{UXT}$. For these conditions, the measured value of $SINR_{UXT}$ is approximately given by:

$$SINR_{UXT} = \left[P_W|H_{SS}|^2\right] / \left[P_W \sum_{J \ne S,K} |H_{SJ}|^2 + P_W|H_{SK}|^2 + P_N\right] \quad (4)$$

In eq. (4), $P_N$ is the average of the noise power at the receiver for the first channel, S, over the time period during which the receiver measures the value of $SINR_{UXT}$.

In the exemplary embodiment of method 30, the measurements of values of $SINR_{CXT,\epsilon}$, $SINR_{CXT,i\cdot\epsilon}$, and optionally $SINR_{NXT}$ at the steps 32, 40, and 38 are made in nearby time periods so that properties of the physical communication medium 12 do not substantially change between these measurements.

In the exemplary embodiment, the step 36 involves determining the amplitude and the phase angle of the ratio $H_{SK}/H_{SS}$ from the measured values of $SINR_{UXT}$, $SINR_{CXT,\epsilon}$, $SINR_{CXT,i\cdot\epsilon}$, and optionally $SINR_{NXT}$ as defined in eqs. (4), (2), and (3). In particular, eqs. (3) and (4) imply that the amplitude satisfies:

$$\left|\frac{H_{SK}}{H_{SS}}\right|^2 = [1/SINR_{UXT} - 1/SINR_{NXT}]. \quad (5)$$

Thus, the performance of the step 36 in the exemplary embodiment may include evaluating the right hand side of eq. (5) to determine the amplitude of $|H_{SK}/H_{SS}|$ from the measured values of $SINR_{NXT}$ and $SINR_{UXT}$ as received at the transmitter in the steps 38 and 40. In alternate implementations of the exemplary embodiment, the performance of the determining step 36 involves evaluating below eqs. (6a) and (6b) to determine the amplitude of $H_{SK}/H_{SS}$ from the values of $SINR_{UXT}$, $SINR_{CXT,\epsilon}$ and $SINR_{CXT,i\cdot\epsilon}$ which are received at the steps 40 and 34.

In the exemplary embodiment, eqs. (2) and (4) imply that the angular argument (arg) of the phase of the ratio $H_{SK}/H_{SS}$ satisfies:

$$\cos\left[\arg\left(\frac{H_{SK}}{H_{SS}}\right)\right] = \frac{1}{2\varepsilon}[1/SINR_{CXT,\varepsilon} - 1/SINR_{UXT} - \varepsilon^2] \cdot \left|\frac{H_{SS}}{H_{SK}}\right| \quad (6a)$$

and $$\sin\left[\arg\left(\frac{H_{SK}}{H_{SS}}\right)\right] = \frac{1}{2\varepsilon}[1/SINR_{CXT,i\cdot\varepsilon} - 1/SINR_{UXT} - \varepsilon^2] \cdot \left|\frac{H_{SS}}{H_{SK}}\right|. \quad (6b)$$

Thus, in the exemplary embodiment, the step 36 involves determining the argument of the phase of ratio $H_{SK}/H_{SS}$ by evaluating the right hand sides of eqs. (6a) and (6b) based on the measured values of $SINR_{UXT}$, $SINR_{CXT,\epsilon}$, and $SINR_{CXT,i\cdot\epsilon}$ received at the transmitter at the steps 40 and 34 and based on the value of $\epsilon^2$. The value of $\epsilon^2$ defines the size of the temporal correlations between the transmitted first signal streams, S, and second signal streams, K, during the measurements of $SINR_{CXT,\epsilon}$, and $SINR_{CXT,i\cdot\epsilon}$. The value of $\epsilon^2$ is known by the transmitter, which transmits these temporally correlated signal streams. By evaluating the right hand sides of eqs. (6a) and (6b), the amplitude $|H_{SK}/H_{SS}|$ can also be determined from the received measurements of $SINR_{UXT}$, $SINR_{CXT,\epsilon}$, and $SINR_{CXT,i\cdot\epsilon}$ as already described. Thus, a transmitter that receives measured values of the SINRs from the steps 34, 40, and optionally 38 and that transmits the first and second signal streams at the step 32 can determine both the phase and the amplitude of the ratio $H_{SK}/H_{SS}$ as described in this exemplary embodiment.

In light of the above description, a person of skill in the art would be able to modify the above-described first exemplary embodiment of the method 30 for other imposed conditions on transmitted per-channel powers.

Example 2

Finding the Channel Matrix in the Absence of Precompensation

Figure 10:
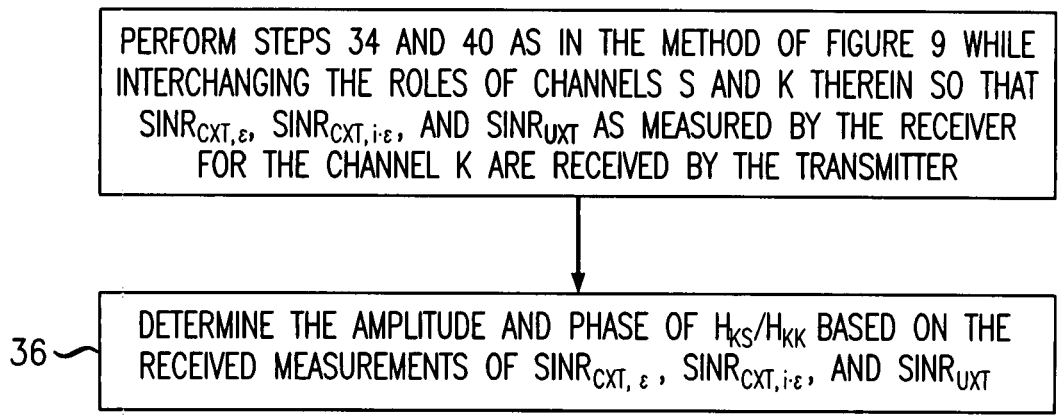
FIG. 10 is a flow chart illustrating a second exemplary embodiment where the methods of FIGS. 7 and 8 is applied to a group of channels that is not precompensated.

Together, FIGS. 9 and 10 illustrate a second exemplary embodiment of the method 30 of FIGS. 7 and 8. The second exemplary embodiment includes performing the first exemplary embodiment of FIG. 9 and performing a modification of the first exemplary embodiment as described in FIG. 10. During the modification, the roles of the first channel, S, and the second channel, K, are exchanged as illustrated in FIG. 10. Through the modification of the first exemplary embodiment of the method 30, the second exemplary embodiment is able to also determine another ratio of channel matrix elements, i.e., $H_{KS}/H_{KK}$, based on measurements of $SINR_{CXT,\epsilon}$, $SINR_{CXT,i\cdot\epsilon}$, and $SINR_{UXT}$ by the receiver for the original second channel. Thus, the second exemplary embodiment provides a determination of ratios of both off-diagonal channel matrix elements between the channel, S, and the channel, K, i.e., a determination of the ratios $H_{SK}/H_{SS}$ and $H_{KS}/H_{KK}$, based on SINR measurements by the receivers for both channels S and K.

In light of the above description, a person of skill in the art would be able to modify the above-described second exemplary embodiment for other imposed conditions on transmitted per-channel powers.

Example 3

Adding a Channel to a Precompensated Group of Channels

FIG. 9 also illustrates a third exemplary embodiment of the method 30 of FIGS. 7 and 8. In the third exemplary embodiment, the step 36 involves determining an off-diagonal element of the channel matrix in the presence of precompensation that removes the crosstalk at receivers of channels $0, \ldots, (K-1)$, i.e., a vectoring group. In particular, this embodiment provides a method for updating the precompensation matrix, F, so that crosstalk can be removed when channel K joins the vectoring group, i.e., by becoming active. With precompensation, the linear crosstalk model is:

$$Y = H \cdot F \cdot W + V. \qquad (7)$$

Here, F is the precompensation matrix, and W is the (K+1) component signal vector received by the precoder. Initially, the precompensation matrix, F, has vanishing off-diagonal elements in row K and column K, i.e., there is no precompensation for the channel K. For a selected channel, S, of the vectoring group, i.e., the first channel of the method 30, the linear crosstalk model becomes:

$$Y_S = M_{SS} \cdot W_S + H_{SK} \cdot X_K + \sum_{J \neq S,K} M_{SJ} \cdot W_J + V_S. \qquad (8)$$

Here, the matrix M is H·F. Eq. (8) can be used to write the form of $SINR_{CXT,z}$, $SINR_{NXT}$, and $SINR_{UXT}$ at the receiver of the first channel, S, for the transmission conditions of the steps 32, 38, and 40 in the method 30. When the channel matrix is diagonally dominant, the zero-forcing is the optimal precompensation by the precoder when the noise is white and Gaussian. For these conditions, the various SINRs satisfy:

$$SINR_{CXT,z} = \left[P_W|H_{SS}|^2 \Big/ \left(P_K|H_{SK} + z \cdot H_{SS}|^2 + P_W \sum_{J \neq S,K} |M_{SJ}|^2 + P_N\right)\right], \qquad (9a)$$

$$SINR_{NXT} = \left[P_W|H_{SS}|^2 \Big/ \left(P_W \sum_{J \neq S,K} |M_{SJ}|^2 + P_N\right)\right], \qquad (9b)$$

$$SINR_{UXT} = \left[P_W|H_{SS}|^2 \Big/ \left(P_K|H_{SK}|^2 + P_W \sum_{J \neq S,K} |M_{SJ}|^2 + P_N\right)\right]. \qquad (9c)$$

Eqs. (9a)-(9b) hold when the third exemplary embodiment maintains additional conditions. First, the $SINR_{CXT,z}$'s are measured while transmitting $(F \cdot W(1))_S, \ldots, (F \cdot W(P))_S$ to the channel, S, and, in parallel, transmitting $(F \cdot W(1))_K, \ldots, (F \cdot W(P))_K$ to the channel, K, i.e., first and second signal streams. Here, the signals $W_S(j)$ satisfy: $W_S(j) = D_S(j) + z \cdot W_K(j)$ for $j = 1, \ldots, P$ where "z" is a real or complex constant scale factor, and $D_S(1), \ldots, D_S(P)$ is substantially temporally uncorrelated to the corresponding signal stream $W_K(1), \ldots, W_K(P)$. For example, the stream of $D_S(j)$'s and the stream of $W_K(j)$'s may carry independent data sequences. Second, during the measuring period of each $SINR_{CXT,z}$, temporal correlations between the signal stream $D_S(1), \ldots, D_S(P)$ and the signal stream transmitted to the second channel, K, are small compared to the transmitted per-channel powers.

For convenience, conditions are also imposed on the powers transmitted to various channels in the third exemplar embodiment. The first power condition is that the average power transmitted to each channel $0, \ldots, K$ is $P_W$ when averaged over a time period used to measure one of the SINRs, e.g., in steps 34, 38, and 40. This condition may not hold for the time-averaged power to first channel, S, at the step 32, and to the second channel, K, at the step 38. The second power condition is that the time-averaged power of the signal stream $D_S(1), \ldots, D_S(P)$ is $P_W$ during the measurements of the $SINR_{CXT,z}$'s, and the time-averaged power of the signal stream $W_S(1), \ldots, W_S(P)$ is $P_W$ during any measurements of $SINR_{UXT}$ and $SINR_{NXT}$. The third power condition is that the time-averaged power of the signal stream $W_K(1), \ldots, W_K(P)$ is $P_K$ during the measurements of $SINR_{CXT,z}$'s and $SINR_{CXT}$.

In this third exemplary embodiment, the step 36 includes determining the amplitude and phase angle of the ratio $H_{SK}/H_{SS}$ from the measured values of $SINR_{UXT}$, $SINR_{CXT,\epsilon}$, $SINR_{CXT,i\cdot\epsilon}$, and optionally $SINR_{NXT}$ based on eqs. (9a), (9c), and optionally (9b). For example, eqs. (9a) and (9b) imply that the amplitude satisfies:

$$\left|\frac{H_{SK}}{H_{SS}}\right|^2 = \left[\frac{P_W}{P_K}\right] \cdot [1/SINR_{UXT} - 1/SINR_{NXT}]. \qquad (10a)$$

Thus, in some implementations of the third exemplary embodiment, the step 36 of method 30 includes evaluating the right hand side of eq. (10a) to determine the amplitude $|H_{SK}/H_{SS}|$. This evaluation may be based on measurements of $SINR_{NXT}$ and $SINR_{UXT}$ that are received at the steps 38 and 40 and also on values of averaged channel K and S powers know by the transmitter. Also, eqs. (9a)-(9C) imply that the argument (arg) of the phase for the ratio $H_{SK}/H_{SS}$ satisfies:

$$\left|\frac{H_{SK}}{H_{SS}}\right| \cos\left[\arg\left(\frac{H_{SK}}{H_{SS}}\right)\right] = \left[\frac{P_w}{2\epsilon P_K}\right] \cdot [1/SINR_{CXT,\epsilon} - 1/SINR_{UXT}] - \frac{\epsilon}{2} \qquad (10b)$$

and $$\left|\frac{H_{SK}}{H_{SS}}\right| \cdot \sin\left[\arg\left(\frac{H_{SK}}{H_{SS}}\right)\right] = \left[\frac{P_w}{2\epsilon P_K}\right] \cdot \left[\begin{array}{c} 1/SINR_{CXT,i\cdot\epsilon} - \\ 1/SINR_{UXT} \end{array}\right] - \frac{\epsilon}{2}. \qquad (10c)$$

Thus, in the third exemplary embodiment, the step 36 includes determining the argument of the phase of $H_{SK}/H_{SS}$ by evaluating the right hand sides of eqs. (10b) and (10c) based on values of $SINR_{UXT}$, $SINR_{CXT,\epsilon}$, and $SINR_{CXT,i\cdot\epsilon}$, which are received at the steps 40 and 34, and based on the value of $\epsilon^2$ known by the transmitter. In some embodiments, the step 36 includes evaluating the right hand sides of eqs. (10b) and (10c) and using the relation $\sin^2 X + \cos^2 X = 1$ to determine the amplitude $|H_{SK}/H_{SS}|$ from SINRs received at the steps 40 and 34, i.e., rather than determining this amplitude by evaluating the right hand side of eq. (10a). Thus, some implementations of the third exemplary embodiment of the method 30 are based solely on eqs. (10b) and (10c) and do not involve either measuring $SINR_{NXT}$ or receiving a measurement thereof.

In light of this description, a person of skill in the art would be able to modify the above-described third exemplary embodiment of the method 30 for other imposed conditions on transmitted per-channel powers.

Example 4

Updating the Channel Matrix While Precompensating

Figure 11:
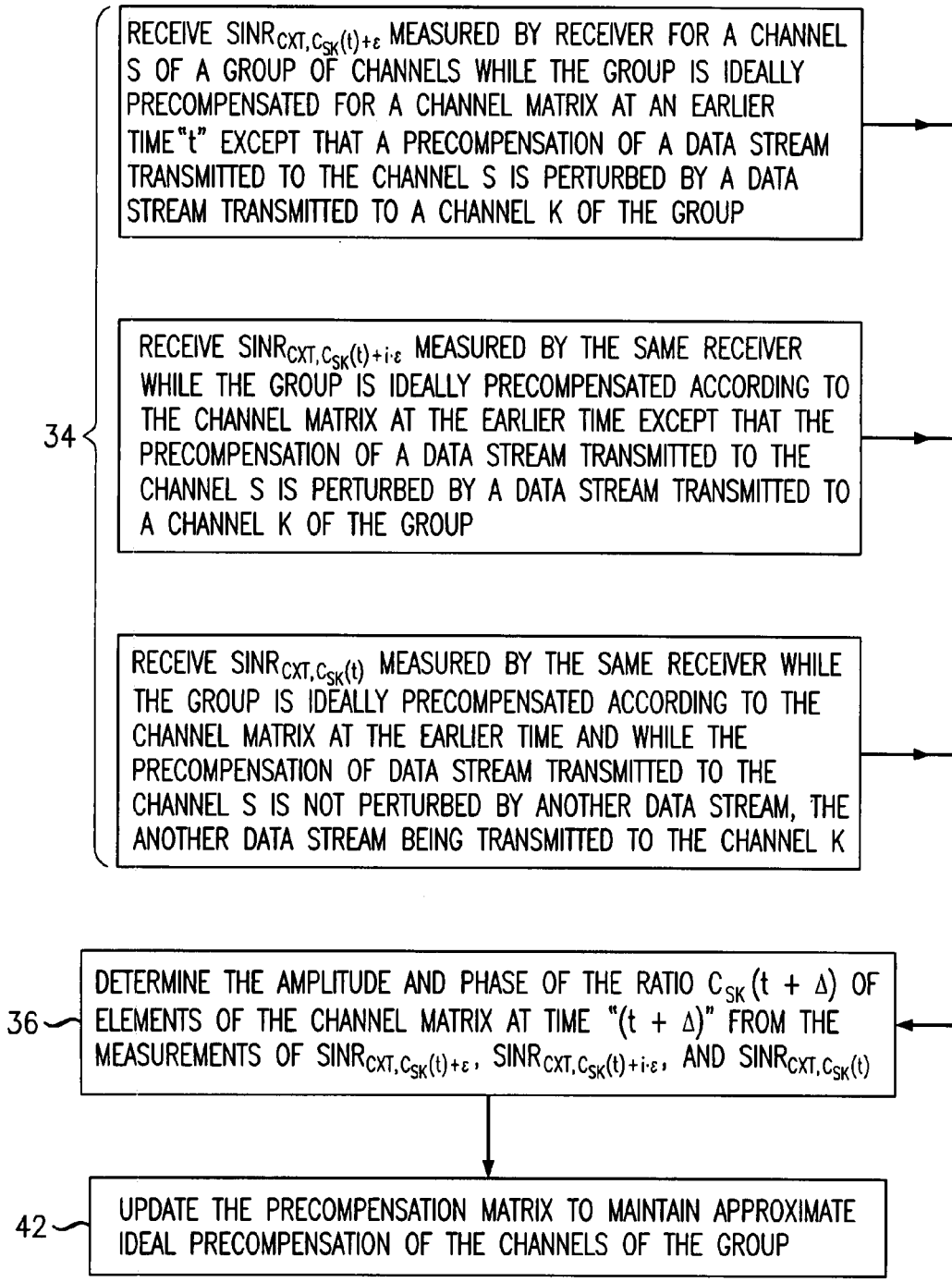
FIG. 11 is a flow chart illustrating a fourth exemplary embodiment where the methods of FIGS. 7 and 8 is applied to update the precompensation of a group of channels to account for a temporal evolution of the channel matrix.
Figure 12:
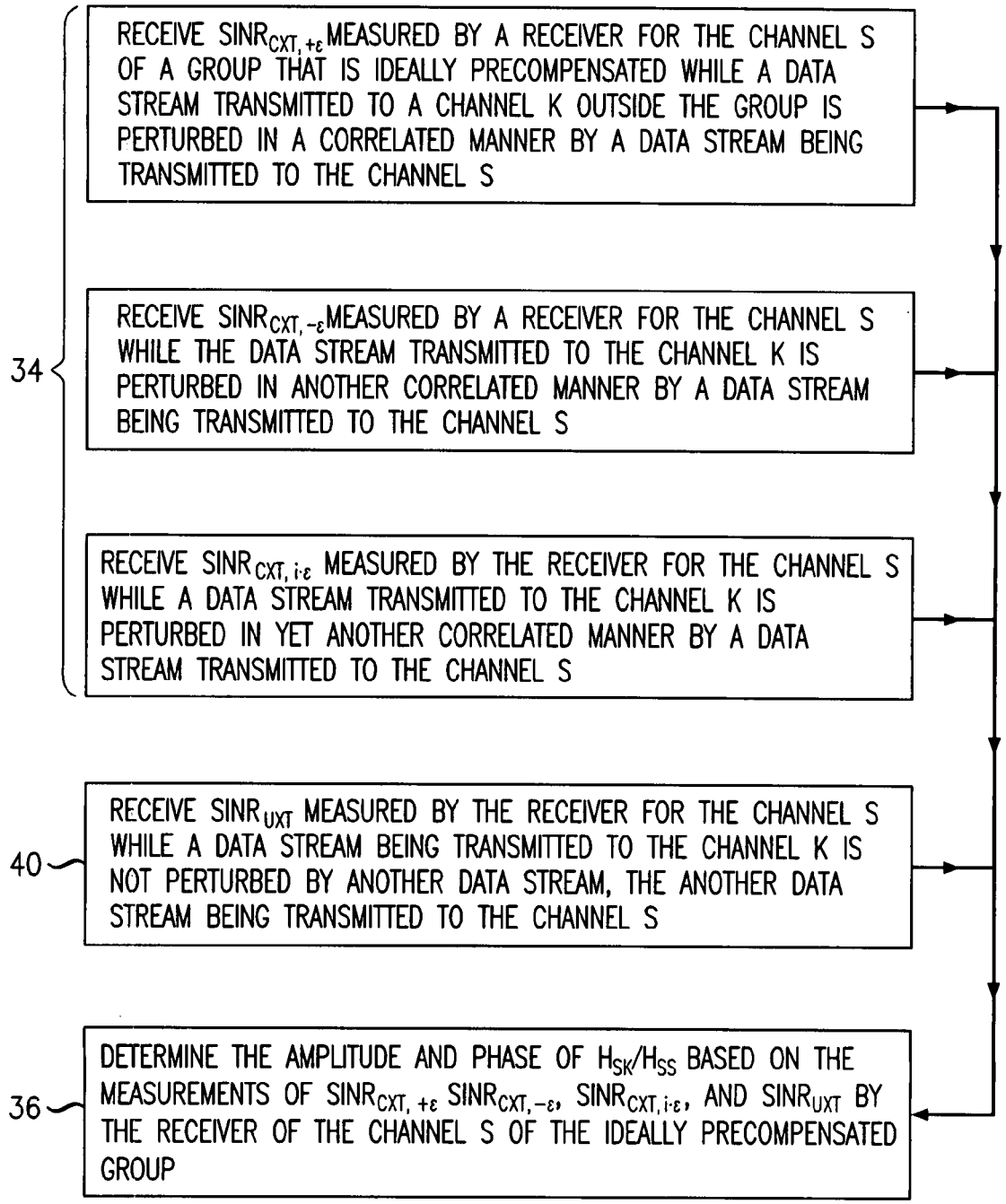
FIG. 12 is a flow chart illustrating a fifth exemplary embodiment where the methods of FIGS. 7 and 8 is applied to determine an element of the channel matrix between an external channel and a channel in a precompensated group wherein a correlated perturbation is transmitted to the external channel to determine the element.

FIG. 11 illustrates fourth exemplary embodiment of the method 30 of FIGS. 7 and 8. The fourth exemplary embodiment of the method 30 tracks the evolution of the off-diagonal element(s) of the channel matrix, H, in time, to maintain approximate ideal precompensation in which crosstalk is removed at the receivers of the channels 0, . . . , K. In this embodiment, precompensation by a precompensation matrix, F(t), approximately removes crosstalk between the channels 0, . . . , K, at time "t". Nevertheless, the temporal evolution of the channel matrix, H(t), may cause the precompensation to be imperfect at a later time "t+Δ". In particular, the channel matrix at time "t", i.e., H(t)=D(t) (I+C(t)), evolves into a channel matrix H(t+Δ)=D(t+Δ)(I+C(t+Δ)) at the time "t+Δ". An approximately ideal precompensation matrix, F(t), at time "t", such as, F(t)=(I−C(t)), preferably should be reset to satisfy: F(t+Δ)=(I−C(t+Δ)) at time "t+Δ".

The fourth exemplary embodiment includes determining one or more elements of the matrix C(t+Δ)) that would be maintain approximately ideal precompensation at the later time "t+Δ". In particular, due to the approximately ideal precompensation by F(t) at time "t+Δ", the signal at the receiver of the channel, S, will satisfy:

$$Y_S = D_{SS}(t+\Delta) \cdot W_S + \sum_{J \neq S} D_{SS}(t+\Delta) \cdot [C_{SJ}(t+\Delta) - C_{SJ}(t)] W_J + V_S. \quad (11)$$

Based on Eq, (11), one can again ask what SINR would be measured at the receiver for the channel, S, if signals of the form $z \cdot W_K$ were added to the signal stream transmitted to the channel, S, where the $W_K$'S define the signal stream transmitted to the channel K. In the presence of such a perturbation, the $SINR_{CXT,z}$ at the receiver for the channel. S. will have the following form:

$$SINR_{CXT,z} = \left( \frac{|C_{SK}(t+\Delta) - C_{SK}(t) + z|^2 +}{\sum_{J \neq S,K} |C_{SJ}(t+\Delta) - C_{SJ}(t)|^2 +} \right)^{-1} \quad (12)$$
$$P_N / [P_W [H_{SS}(t+\Delta)]^2]$$

This exemplary embodiment includes maintaining several conditions during the performance of the SINR measurements at the step 32 in the method 30 such that eq. (12) follows. First, the step 32 involves transmitting $W_S(1)$, . . . , $W_S(P)$ to the precoder while transmitting, in parallel, $W_K(1)$, . . . , $W_K(P)$, wherein each signal $W_S(j)$ satisfies $W_S(j)=D_S(j)+z \cdot W_K(j)$ for $j=1, \ldots, P$. Here, temporal correlations between the signal stream $D_S(1)$, . . . , $D_S(P)$ and the signal stream $W_K(1)$, . . . , $W_K(P)$ are small compared to transmitted per-stream powers. Second, temporal correlations between the unprecoded signal stream, S, and the unprecoded signal streams for the other channels 0, . . . , (K−1) are small compared to transmitted per-channel powers at the step 32. For convenience, at the step 32, conditions are also imposed on transmitted powers, but a person of skill in the art would be able to easily modify the described exemplary embodiment if other power conditions were imposed. The first power condition is that the time-averaged power transmitted to each channel 0, . . . , K is $P_W$, except for the first channel, S. The second power condition is that the time-averaged power of the signal stream $D_S(1)$, . . . , $D_S(P)$ is $P_W$ during the measurements of the $SINR_{CXT,z}$'s.

In this exemplary embodiment, the step 36 involves determining the amplitude and phase angle of an element of the matrix C(t+Δ) between the first and second channels, i.e., based on values of $SINR_{CXT,z}$, measured near a time of "t+Δ" and received at the transmitter at the step 34. For example, the measured values of $SINR_{CXT,z}$ may include values for z equal to $C_{SK}(t), C_{SK}(t)+\epsilon$, and $C_{SK}(t)+i \cdot \epsilon$. For such values, above eq. (12) implies that the real and imaginary parts of $C_{SK}(t+\Delta)$ satisfy:

$$\text{Re}[C_{SK}(t+\Delta)] = \left[\frac{1}{2\epsilon}\right] \cdot \left[\begin{array}{c} 1/SINR_{CXT,C_{SK}(t)+\epsilon} - \\ 1/SINR_{CXT,C_{SK}(t)} - \epsilon^2 \end{array}\right] \quad (13a)$$

and $$\text{Im}[C_{SK}(t+\Delta)] = \left[\frac{1}{2\epsilon}\right] \cdot \left[\begin{array}{c} 1/SINR_{CXT,C_{SK}(t)+i \cdot \epsilon} - \\ 1/SINR_{CXT,C_{SK}(t)} - \epsilon^2 \end{array}\right]. \quad (13b)$$

In eqs. (13a) and (13b), the SINRs have subscripts {CXT, $C_{SK}(t)$}, {CXT, $C_{SK}(t)+\epsilon$}, and {CXT, $C_{SK}(t)+i \cdot \epsilon$} to indicate the conditions for the SINR measurements. In each subscript, the second element, i.e., $C_{SK}(t), C_{SK}(t)+\epsilon$, and $C_{SK}(t)+i \cdot \epsilon$, is the value of the (S, K) element of the precompensation matrix, F(t) during the measurement of the corresponding SINR. In the fourth exemplary embodiment, the step 36 may include using the measured values of $SINR_{CXT,z}$ received at the step 34 to evaluate the right hand sides eqs. (13a) and (13b). Then, the step 36 may include determining both the argument of the phase of and the amplitude of $C_{SK}(t+\Delta)$ from those evaluations. Such determinations provide an estimate of a ratio of the (S, K) off-diagonal element of the channel matrix, H(t+Δ), to a diagonal element thereof.

This fourth exemplary embodiment may also include determining ratios of off-diagonal of the channel matrix, H(t+Δ), to diagonal elements thereof for all off-diagonal elements of therein. In such cases, as illustrated in FIG. 11, the fourth exemplary embodiment of the method 30 may include updating the precompensation matrix, F, to provide approximately ideal precompensation at the time "t+Δ" (step 42).

In light of this description, a person of skill in the art would be able to modify the above-described fourth exemplary embodiment of the method 30 for other imposed conditions on transmitted per-channel powers.

Example 5

Finding Channel Matrix in the Absence of Precompensation

FIG. 9 illustrates a fifth exemplary embodiment of the method 30 of FIGS. 7 and 8. In this embodiment, the channel S belongs to a group of channels 0, ... (K−1) that initially has an approximately ideal precompensation, and the channel K is external to the group. In this exemplary embodiment, the determination of off-diagonal element(s) of the channel matrix is based on SINR measurements at the receiver for the channel S.

This fifth embodiment is again described by above eq. (7). In this embodiment, correlations between the signal streams transmitted to the channels S and K are produced by perturbing the stream to be transmitted to the disturber channel K rather than by perturbing the signal stream to be transmitted to the channel S. The component S of eq. (7) describes the signal whose SINR measurement is the basis of the method 30 in this exemplary embodiment. Then, for the conditions described with respect to the third exemplary embodiment, its is possible to describe the ratio $H_{SK}/H_{SS}$ of elements of the channel matrix in terms of SINRs as follows:

$$\mathrm{Re}\,[H_{SK}/H_{SS}] = \left[\frac{1}{4\varepsilon}\right] \cdot [(SINR_{CXT,+\varepsilon} - SINR_{CXT,-\varepsilon})/SINR_{UXT}] \quad (14a)$$

and $$\mathrm{Im}\,[H_{SK}/H_{SS}] = \left[\frac{1}{4\varepsilon}\right] \cdot \left[\left(\begin{array}{c}SINR_{CXT,+\varepsilon} - \\ SINR_{CXT,-\varepsilon} - 2 \cdot SINR_{CXT,i\cdot\varepsilon}\end{array}\right)\Big/ SINR_{UXT}\right]. \quad (14b)$$

Here, $SINR_{CXT,+\varepsilon}$ $SINR_{CXT,-\varepsilon}$ $SINR_{CXT,i\cdot\varepsilon}$, and $SINR_{UXT}$ are measured by the receiver for the channel S for signal streams $W_S(1), \ldots, W_S(P)$ and $W_K(1), \ldots, W_K(P)$ where the $W_K(j)$'s are perturbed by the signal stream S so that $W_K(j)=D_K(j)+z\cdot W_K(j)$ for $j=1, \ldots, P$. Here, "z" is $+\varepsilon$, $-\varepsilon$, $i\cdot\varepsilon$, or 0 as appropriate. Other measuring conditions for $SINR_{CXT,+\varepsilon}$ $SINR_{CXT,-\varepsilon}$ $SINR_{CXT,i\cdot\varepsilon}$ and $SINR_{UXT}$, as in eqs. (14a) and (14b), are similar to those for SINRs of already described exemplary embodiments of the method 30 as would be understood by a person of skill in the art. For such conditions, in this fifth exemplary embodiment, the phase and amplitude of the ratio $H_{SK}/H_{SS}$ may be determined at the step 36 of the method 30 by evaluating the right hand sides of eqs. (14a) and (14b) with measured SINRs received at the steps 34 and 40 of FIG. 8.

In light of this description, a person of skill in the art would be able to modify the above-described fourth exemplary embodiment of the method 30 for other imposed conditions on transmitted per-channel powers.

In the above description of various exemplary embodiments of the method 30, illustrative choices have been described for signal streams transmitted to the individual channels during the measurements of SINRs. Applicants intend and expect that the inventions are not restricted to particular forms of said signal streams.

In various embodiments, values of diagonal elements of the channel matrix, H, may also be obtained via single-end line tests (SELTs) or dual-end line tests (DELTs) at run time and/or via initialization protocols. For the multi-channel communication system 10 of FIG. 1, values of these elements may be obtained through measurements by the transmitter 14 and/or by the one or more receivers $16_1, \ldots, 16_N$.

The first through fifth exemplary embodiments of the method 30 may exploit a communication protocol of one or more receivers $16_1, \ldots, 16_N$, wherein the protocol provides for measuring and reporting back channel SINRs. For example, the VDSL 2 standard provides that some DSL transceivers will measure values of SINRs over groups of nearby DSL tones, e.g., 4-8 tones and averages such SINRs. Such DSL transceivers will transmit these averaged SINR values to the DSL transceiver in a telecom's central office. Here, such averaged SINR measurements over groups of nearby tones are exemplary of the channel SINR measurements received at the steps 34, 38, and 40 of method 30.

From the disclosure, drawings, and claims, other embodiments of the invention will be apparent to those skilled in the art.

What we claim is:

1. A method, comprising:
   transmitting a first signal stream to a first channel of a multi-channel communications medium while transmitting a second signal stream to a different second channel of the medium, the second signal stream being substantially temporally correlated to the first signal stream; and
   receiving a signal-to-interference-plus-noise ratio measured at a receiver, the receiver being configured to receive signals from the first channel of the medium, the signal-to-interference-plus-noise ratio measured while the receiver received the first signal stream; and
   determining a channel matrix element between the first and second channels or a ratio of said channel matrix element to a diagonal element of the channel matrix, the act of determining being based on the received signal-to-interference-plus-noise ratio.

2. The method of claim 1, wherein the act of determining includes estimating a phase and an amplitude of the ratio of the channel matrix element to the diagonal element of the channel matrix.

3. The method of claim 1, wherein the act of determining includes estimating a phase and an amplitude of the channel matrix element between the first and second channels.

4. The method of claim 1, further comprising transmitting a third signal stream to the first channel of the medium while transmitting a fourth signal stream to the second channel of the medium, the third and fourth signal streams being substantially temporally uncorrelated; and
   wherein the act of determining is based, in part, on a signal-to-interference-plus-noise ratio measured by the receiver while receiving the third signal stream.

5. The method of claim 4, wherein the act of determining includes estimating a phase and an amplitude of the ratio of the channel matrix element between the first and second channels to the diagonal element of the channel matrix.

6. The method of claim 4, wherein the act of determining includes estimating a phase and an amplitude of the channel matrix element between the first and second channels.

7. The method of claim 1, wherein the first signal stream is produced by precoding a third signal stream and the second signal stream, the third and second signal streams being substantially temporally uncorrelated.

8. The method of claim 7, further comprising transmitting a fourth signal stream to the first channel of the medium while transmitting a fifth signal stream to the second channel of the medium, the fourth and fifth signal streams being substantially temporally uncorrelated; and
   wherein the act of determining is based in part on a signal-to-interference-plus-noise ratio measured by the receiver while receiving the fourth signal stream.

9. The method of claim 1, further comprising:

receiving a second signal-to-interference-plus-noise ratio measured at a second receiver, the second receiver being configured to receive signals from the second channel of the medium; and determining a different channel matrix element between the first and second channels or a ratio of said different channel matrix element to a diagonal element of the channel matrix, the act of determining a different channel matrix element between the first and second channels or a ratio of said different channel matrix element to a diagonal element of the channel matrix being based on the received second signal-to-interference-plus-noise ratio.

10. The method of claim 1, wherein the act of transmitting a first signal stream includes transmitting the first signal stream from a DSL transmitter to a first local subscriber loop while the second signal stream is transmitted by another DSL transmitter to another local subscriber loop.

11. The method of claim 1, wherein the act of transmitting a first signal stream includes transmitting the first signal stream to a first frequency channel while the second signal stream is transmitted to a different second frequency channel.

12. An apparatus, comprising:

a transmitter configured to transmit a first signal stream to a first channel of a communications medium and to transmit a second signal stream to a second channel of the communications medium; and wherein the transmitter is configured to cause the first signal stream to be temporally correlated to the second signal stream while a signal-to-noise ratio is measured at a receiver connected to receive the first signal stream from the first channel; and wherein the transmitter is configured to determine an off-diagonal element of the channel matrix between the first and second channels or a ratio of said element to a diagonal element of the channel matrix, the transmitter being configured to determine the element or the ratio based on a received value of the measured signal-to-interference-plus-noise ratio.

13. The apparatus of claim 12, wherein the transmitter includes a second transmitter configured to transmit the first signal stream to a first local subscriber loop as DSL tones and a third transmitter configured to transmit the second signal stream to another local subscriber loop stream as DSL tones to another local subscriber loop.

14. The apparatus of claim 13, wherein the first transmitter is configured to estimate a phase and an amplitude of the ratio of the channel matrix element between the first and second channels to the diagonal element of the channel matrix.

15. The apparatus of claim 13, wherein the first transmitter is configured to estimate a phase and an amplitude of the channel matrix element between the first and second channels.

16. The apparatus of claim 13, wherein the first transmitter is configured to produce the first signal stream by precoding a third signal stream and the second signal stream, the third and second signal streams being substantially temporally uncorrelated.

17. The apparatus of claim 12, wherein the transmitter includes a second transmitter configured to transmit the first signal stream to a first frequency channel of the medium and a third transmitter configured to transmit the second signal stream to a different second frequency channel of the medium.

* * * * *